Aug. 11, 1953　　　R. M. DALY　　　2,648,266
　　　　　　　　　CAMERA SLIDE

Filed June 12, 1950　　　　　　　　　2 Sheets-Sheet 1

INVENTOR
ROBERT M. DALY
BY
ATTORNEY

Aug. 11, 1953  R. M. DALY  2,648,266
CAMERA SLIDE

Filed June 12, 1950  2 Sheets-Sheet 2

INVENTOR
ROBERT M. DALY
BY *Peter H. Behrendt*
ATTORNEY

Patented Aug. 11, 1953

2,648,266

UNITED STATES PATENT OFFICE 2,648,266

CAMERA SLIDE

Robert M. Daly, New York, N. Y.

Application June 12, 1950, Serial No. 167,657

4 Claims. (Cl. 95—36)

This invention relates to a camera slide and, more particularly, to a slide of the type that is interposed between the lens opening and the sensitized plate or film and is provided with an aperture to permit exposure of a selected portion of the plate or film.

An object of my invention is to provide a device whereby a plurality of exposures, more particularly, four exposures may be made of distinct parts of the sensitized medium by means of a single apertured slide.

Another object of my invention is to provide a slide for the purpose stated which can be used in any standard type of camera, film holder or plate holder provided the same has the customary guideway for the common type of exposure slide.

A further object of my invention is to furnish a slide as indicated which can be firmly positioned in the camera for each of several exposures without provision of special locking or stop means either on the slide or on the camera.

Further objects and advantages of my invention will become apparent from the following description when read in conjunction with the accompanying drawings in which Fig. 1 is an elevation of an apertured slide according to the invention showing the slide in position in the plate holder, the latter being indicated in a purely diagrammatic manner;

Figure 1:
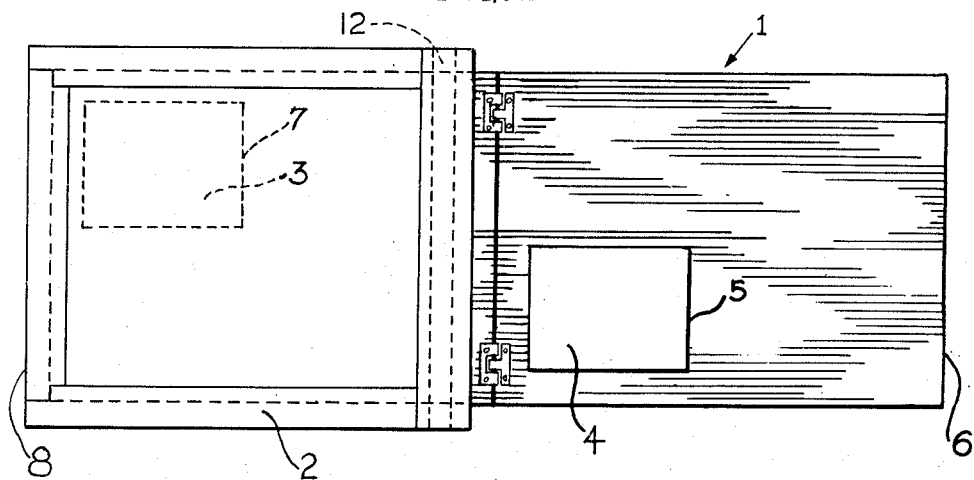
Figure 2:
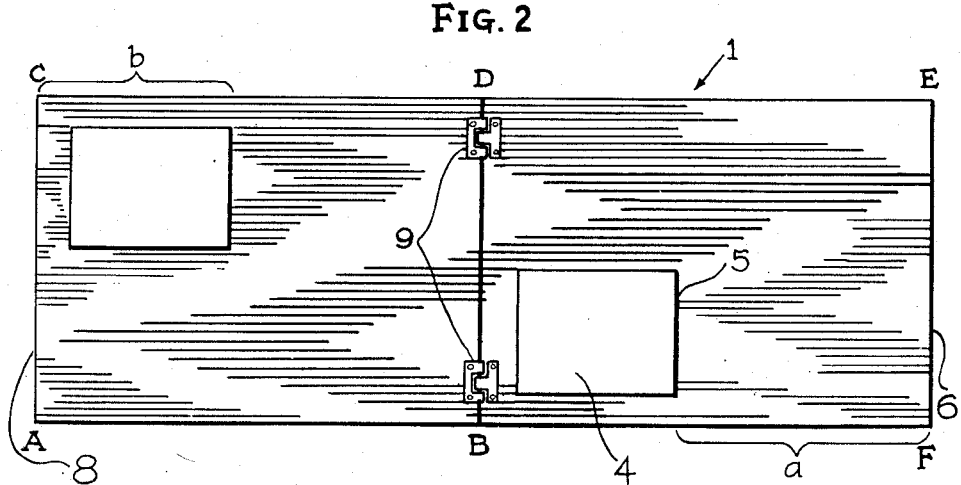
Fig. 2 is a similar view of the apertured slide when removed from the camera.
Figure 3:
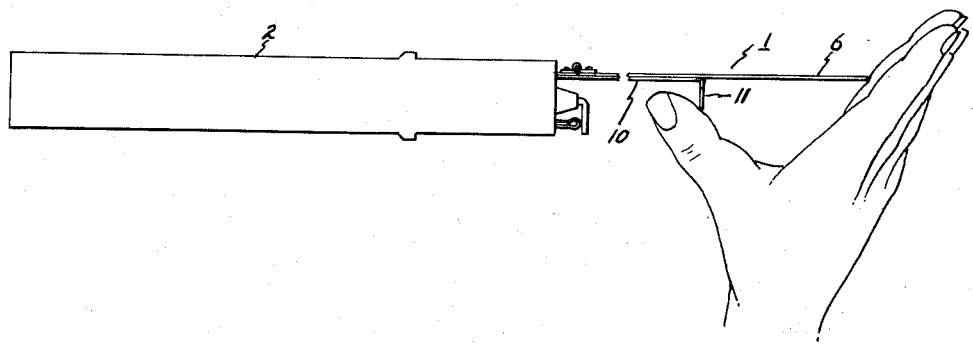
Fig. 3 is a side view of plate holder with the apertured slide and an auxiliary solid slide to be used in conjunction with the apertured slide in position.
Figure 4:
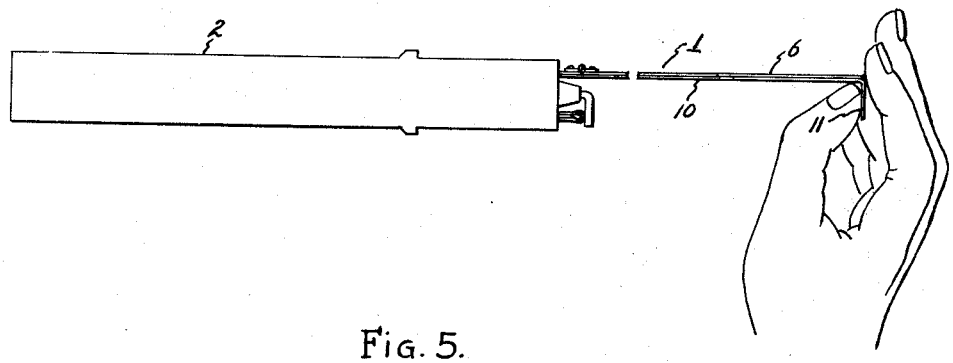
Fig. 4 is a view similar to Fig. 3 but showing the auxiliary slide partially withdrawn so as to permit the taking of pictures.

Referring to the drawings, it will be seen that the apertured slide, generally indicated as I, has rectangular form and is placed in the guideway of a conventional plate or film holder indicated as 2. As appears, the slide has a length approximately twice the width of the total exposure opening of the camera. Only about one half of the slide is, therefore, received in the guideway; the other half projects laterally therefrom.

The two portions of the slide are movably linked together by a hinge 9 so as to permit folding of the slide upon itself.

The slide I is solid except for the two openings 3 and 4. There are thus provided two surface portions ABCD and BDEF each of which has a size at least equal to the total exposure opening. One aperture is provided for each surface portion and both apertures are located, as appears, to the left of the vertical or transverse center lines of the respective surface portions. In addition, aperture 3 is above and aperture 4 is below the horizontal center line of the slide.

The slide is used as follows: Starting in the posiiton shown in the drawing, an exposure is first made through opening 3 after removal of the conventional slide that shuts off the light from all of the plate. Thereafter, the slide is inverted top to bottom and thus another exposure is made through aperture 3, this time exposing the square vertically beneath that exposed previously. The slide is thereupon inverted endwise whereby surface portion BDEF is moved inside the camera, with line EF being innermost and surface portion ABCD remaining outside the camera. An exposure can now be made through aperture 4, exposing the upper right hand corner of the plate or film. Another exposure exposing the lower right hand corner may follow by again inverting the slide top to bottom but keeping it in the same endwise position, that is, with surface portion BDEF inside and surface portion ABCD outside the camera.

Of course, the sequence of the operations may be changed at will. Also the shape and number of openings is open to some changes depending upon the character of the work. However, in order to permit endwise inversion of the slide it is essential that the apertures be placed so as to avoid overlying of the same area or overlapping areas of sensitized plate or film when the slide is inverted endwise.

Regularly, each aperture will be of the size to occupy about one fourth of the total exposure opening. In that case the apertures must be arranged at corresponding sides of the vertical center of each surface portion, e. g., both to the left or both to the right of the center lines. Inversion of the slide will then expose quadrants in the half of the photographic plate not previously exposed.

However, the apertures may be substantially smaller than a full quadrant and may have any desired shape or size provided only that the distance $a$ of the outer edge 5 of aperture 4 from outside edge 6 of the slide is at least equal to distance $b$, that is, the distance of inner edge 7 of aperture 3 from outside edge 8 of the slide.

The single aperture shown in the drawing in each surface portion may also be split into several units, e. g. into two strip-shaped apertures provided all of these units are in one and the same area as indicated for the single aperture. Such arrangement, therefore, would not amount to an increase in the number of exposures; the two strip-like apertures would be exposed simultaneously.

It will furthermore be noted that in the embodiment shown aperture 3 is above and aperture 4 is below the horizontal center line. This, however, is by way of illustration only and does not constitute an essential feature since the top to bottom inversion of the slide permits exchange of the relative position of the apertures with regard to the horizontal center line.

The single apertured slide according to my invention thus permits the taking of up to four different exposures on one plate or film which may be sectioned accordingly. The slide is useful with any type of camera wherein a slotted guideway is provided for the regular solid slide. It is in particular suited to presstype cameras with a fixed or revolving back. It dispenses with the necessity of using a plurality of slides for different exposures or pairs of exposures and, in general, eliminates the need for specially formed slides or camera parts having lock or stop devices, such as cooperating projections and recesses, for positioning the slide in the camera. The slide described rests in each of its four positions firmly with its inner end against the camera wall forming the end of the slide guideway.

It will be understood that the hinged connection of the two slide portions permits doubling-up of the slide for storage during non-use.

Figure 5:
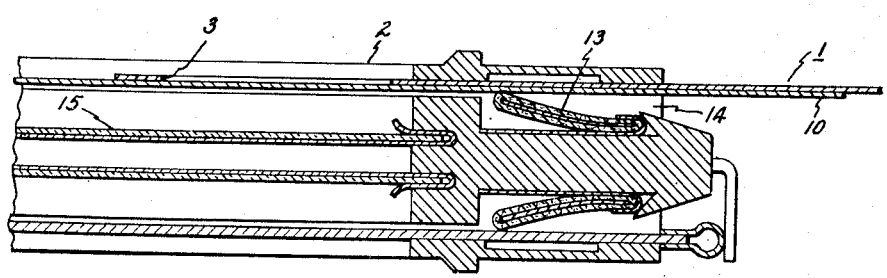
Fig. 5 is a partial lengthwise section, on an enlarged scale, through the plate holder showing the auxiliary solid slide in the innermost position and the apertured slide in the process of withdrawal.

If desired an auxiliary solid slide 10 may be used in conjunction with the apertured slide 1 to prevent catching of the fingers or tongues of the conventional light trap in the exposure openings 3 or 4 when slide 1 is moved in and out of place. It is shown in greater detail in Fig. 5. As will be seen, a row of felt covered fingers or tongues 13 is spring-forced against the opposite wall constituted by the solid slide 10. Thus entry of light to the slot 14 through which the slides 1 and 10 move is effectively prevented.

The auxiliary slide 10 is of an overall width to completely cover the total exposure opening of the camera. Conveniently, slide 10 has an edge portion 11 turned out at right angles to form a finger grip. Slide 10 is shorter than slide 1, the distance between edge portion 11 of slide 10 and edge 6 of slide 1 being about equal to the gripping span of the hand of the operator.

Thus, slide 10 may be moved from its innermost position to an outer position by simply shoving it outwards with the thumb while bearing with the other fingers against edge 6 of slide 1. Thereby, the exposure opening 3 is uncovered and, after taking of a picture through exposure of the film or plate 15, the slides can then be removed together in one manipulation. After inverting slide 1, both slides can thereafter again be inserted together. Also slide 10 can remain in holder between exposures.

It will be appreciated that slide 10 forms a convenient basis for bearing indicia outlining and numbering the several exposure surfaces. The auxiliary slide, therefore, is useful also as an exposure counter.

It will be understood that modifications of the embodiment shown are possible without departing from the spirit of the invention. I, therefore, do not wish to be limited otherwise than by the language of the appended claims. In the above description the expressions "vertical" and "horizontal" whenever used with regard to the slides refer to the position the slides occupy when the slot for insertion of the slides extends vertically. It will be understood that these expressions would have to be reversed in case of a camera with a top or horizontal slot.

The expressions "longitudinal" and "transverse" in the claims refer to the direction in which the slide is inserted in the camera. "Longitudinal," therefore, is parallel to this direction and "transverse" is at right angles thereto.

What I claim is:

1. A device for making multiple exposure on a plate or film disposed in a holder of the type having an open end and light excluding means adapted to be deflected across said open end, the said device comprising in combination a main dark slide having an exposure aperture disposed to one side of its transverse center line and being adapted for withdrawal from the open end of the holder so as to permit its reversal and an auxiliary dark slide of a size sufficient to cover the said exposure aperture of the main slide so as to prevent catching of the light-excluding means in said exposure aperture.

2. A device for making multiple exposures on a plate or film comprising a holder for the plate or film, a main dark slide having aperture means to provide for an exposure area, the said aperture means disposed to one side of the transverse center line of the main dark slide and the said main dark slide being adapted for withdrawal from one end of the holder so as to permit its reversal; light-excluding means extending across said holder and being adapted to be deflected into the path of said main dark slide upon withdrawal of the latter; and an auxiliary dark slide of a size sufficient to cover the exposure area provided by said main dark slide so as to prevent catching of the light-excluding means in said aperture means.

3. A device for making multiple exposures on a plate or film disposed in a holder of the type having an open end and light-excluding means adapted to be deflected across said open end, the said device comprising in combination a main dark slide having aperture means providing for an exposure area and being adapted for withdrawal from one end of the holder and the said main dark slide having a length about twice the length of the holder for which the device is intended so as to protrude therefrom when in place, and an auxiliary dark slide having a finger piece formed at one of its endwise edges, the said auxiliary slide being shorter than the main slide by a length about equal to the gripping span of a human hand and the said auxiliary slide having a size sufficient to cover the said exposure area provided by said main dark slide so as to prevent catching of the light-excluding means in said aperture means.

4. A device for making multiple exposures on a plate or film disposed in a holder of the type having an open end and light-excluding means adapted to be deflected across said open end, the said device comprising in combination a main dark slide adapted for withdrawal from one end of the holder and having two interconnected solid surface portions arranged side by side in a longitudinal direction and each having a length about equal to the length of the holder for which the device is intended, each of said solid portions being provided with an exposure aperture and the said apertures being disposed at corresponding sides of the transverse centerlines of said surface portions; and an auxiliary dark slide of a length at least equal to the length of one of said surface portions so as to prevent catching of said light-excluding means in one of said exposure apertures of the main slide.

ROBERT M. DALY.

References Cited in the file of this patent

UNITED STATES PATENTS

| Number | Name | Date |
|---|---|---|
| 2,503,547 | Crowe | Apr. 11, 1950 |

FOREIGN PATENTS

| Number | Country | Date |
|---|---|---|
| 586,112 | France | Dec. 22, 1924 |